Jan. 11, 1966    A. P. RINFRET ET AL    3,228,838
PRESERVATION OF BIOLOGICAL SUBSTANCES
Filed April 23, 1959    4 Sheets-Sheet 1
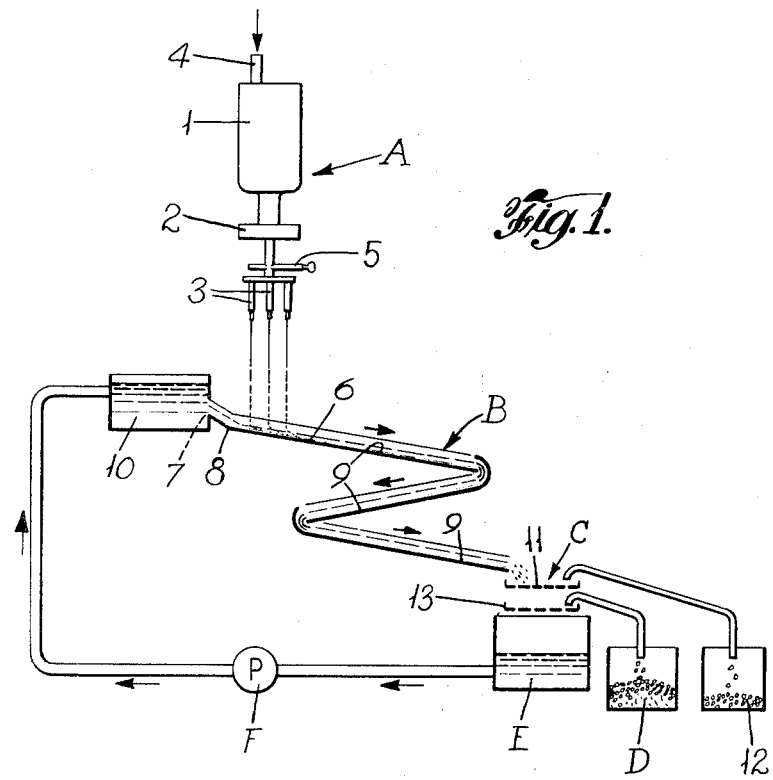
*Fig. 1.*
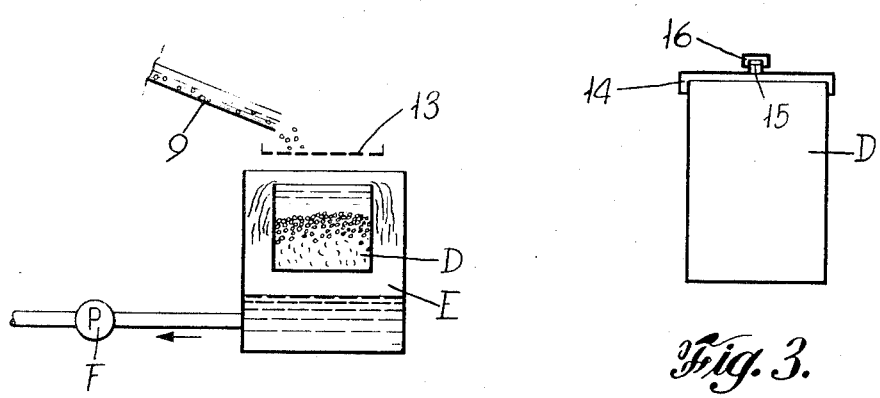
*Fig. 2.*
*Fig. 3.*
INVENTORS
ARTHUR P. RINFRET
CLEMENT W. COWLEY
WILLIAM J. TIMSON
BY
Michael J. Pantuliano
ATTORNEY Jan. 11, 1966   A. P. RINFRET ETAL   3,228,838
PRESERVATION OF BIOLOGICAL SUBSTANCES
Filed April 23, 1959   4 Sheets-Sheet 3

INVENTORS
ARTHUR P. RINFRET
CLEMENT W. COWLEY
WILLIAM J. TIMSON
BY
Michael J. Pantuliano
ATTORNEY

INVENTORS
ARTHUR P. RINFRET
CLEMENT W. COWLEY
WILLIAM J. TIMSON

United States Patent Office 3,228,838
Patented Jan. 11, 1966

3,228,838
PRESERVATION OF BIOLOGICAL SUBSTANCES
Arthur P. Rinfret, Buffalo, Clement W. Cowley, Tonawanda, and William J. Timson, Buffalo, N.Y., assignors to Union Carbide Corporation, a corporation of New York
Filed Apr. 23, 1959, Ser. No. 808,400
33 Claims. (Cl. 167—74)

This invention relates to the art of low temperature preservation of biological substances. More particularly, this invention relates to processes for quick-freezing and preserving biological substances, such as blood, which are divisible into droplets, and to apparatus for carrying out such processes.

The means of preserving biological substances, such as blood, bacteria, yeast, beverages, and the like, from degradation on storing has been a constant problem facing scientists. The problem has been especially acuate in the case of blood. The maintenance of blood banks and the desirability of storing whole blood in huge quantities for use in the event of catastrophe has made imperative the need for a process for the extended preservation of stored blood. No processes and apparatus heretofore mployed have proved completely satisfactory for large scale preservation and storage of one-pint lots of transfusible whole blood.

In the case of blood, the primary viable constituents are the erythrocytes or red blood cells. Hence, the problem of preserving whole blood basically relates to the preservation of the red blood cells. The red blood cells are globular in form and contain a special kind of cytoplasm enclosed in a semi-permeable membrane. This membrane preserves the integrity of the enclosed protein and the electrolyte content of the contained cytoplasm. The membrane is ductile, but essentially non-elastic and thus has a critical maximum volume beyond which disruption occurs. Disruption of the membrane results in the release of the oxygen-carrying element of the erythrocytes, i.e. hemoglobin, into the blood plasma where it cannot function to carry oxygen and carbon dioxide. The amount of hemoglobin released from the cells provides a measure of the efficiency of various blood preservation processes. The lower the amount of hemoglobin released, the greater the efficiency of the process and/or apparatus for preserving the cells.

Normally i.e. in the circulatory system of the body, the red blood cells have a life span of between about 100 days and 120 days. However, outside the body, the red blood cell deteriorates much more rapidly. One of the changes affecting blood outside of the body is the phenomena of clotting. It is important for purposes of storing blood that clotting be avoided. To this end, the addition of citrate, oxalate, or fluoride ions is effective. These ions inhibit the chemical changes, such as the interaction of calcium ions with certain components, which ordinarily result in clotting. However, clotting is not the only problem affecting stored blood.

Blood is normally in motion, but upon storing, it assumes an unnatural position, i.e., that of non-motion. As a consequence thereof, the usually suspended red blood cells gradually settle to the bottom of the containers. The red cell has its own supporting metabolism and outside the body it carries on its metabolic processes until the blood sugar is depleted and converted to lactic acid. This results in lowering the pH of the plasma to an unsatisfactory level. The osmotic balance between the intracellular material and the extracellular material is soon destroyed in drawn blood and water from the plasma diffuses into the cell causing abnormal swelling and eventual membrane rupture. These changes occur rapidly at room temperature and at ordinary citrate and glucose concentrations.

The most commonly used process for preserving blood from the afore-mentioned deleterious changes involves the collection of blood from a donor in an acid, citrate-dextrose solution, thereafter followed by refrigeration at between 4° C. and 6° C. This process, however, only allows the safe storage of whole blood for about three weeks. At the end of that time, the degradative processes set out above have proceeded to a point where the functional efficiency of the blood cells has declined below acceptable levels. It has proven impossible to stockpile such blood since each unit must be replaced every three weeks.

Other processes have been tried, but none has proven adaptable to convenient commercial stockpiling of whole human blood in single units of one-half or one pint each. These processes generally involve the use of greatly reduced temperatures to retard red cell deterioration.

Blood has been frozen in bulk and in thin films. Where bulk freezing has been attempted, protective chemicals such as glycerol have been employed to protect the red cells from the damage of ice crystallization. These protective chemicals have to be removed from the blood before it can be transfused. As such, therefore, these bulk freezing processes have proven to be expensive and time consuming. Furthermore, the apparatus and techniques necessary to separate the protective chemicals from the blood are tedious and expensive and are not adaptable to use by hospital technicians. Nor, are they adaptable to stockpiling transfusible blood.

Another experimental process has been described which employs polyvinylpyrrolidone as a protective medium for the preservation of whole blood. (Compts. Rendus Des Sciences de la Soc. de Biologie, 149, 875, 1955.) This process involves freezing blood in 35 percent polyvinylpyrrolidone by immersion in a Dry Ice bath. The process is of little value because of the large volume of polyvinylpyrrolidone which must be transfused, if separation of the red blood cells (reconstitution in plasma, clumping of the cells, and the like, is to be avoided.

Other processes have been disclosed for freezing foodstuffs, blood plasma, and the like in droplet form. U.S. Patent 2,751,762 relates to a process for freezing coffee extract by ejecting the coffee into a bath of trifluorotrichloroethylene and normal hexane at a low temperature (−50° C.). In this process the coffee is ejected into the freezing bath at the bottom of a column and floats upward to a discharge point. This process and apparatus is not adaptable to the preservation of blood because the hydrocarbons and halohydrocarbons cause hemolysis of the red blood cells. Further, ejection of the warm blood directly into liquid nitrogen results in the freezing of the ejection nozzles due to the much lower temperature.

The preservation of bacteria by subjecting them in bulk to ultra-low temperature is known. However, the preservation of bacterial suspensions in droplet form has not been heretofore undertaken. An advantage of freezing in droplet form when preservation by freeze-drying is desired is that the increased surface-to-volume ratio vastly decreases the drying time. It is important to quick-freeze in a minimum of time in order to avoid the degradative and harmful effects outlined heretofore, particularly in the case of biological substances such as blood.

It is the object of this invention, therefore, to provide process of and apparatus for treating and preserving biological substances.

It is also an object of this invention to provide process of and apparatus wherein whole blood may be stored in substantial volume over long periods of time without undergoing degradation of the red blood cells, and wherein said red blood cells will have a high recovery survival rate at the end of storage.

It is also the object of this invention to provide process of and apparatus for preserving biological substances, thereby conserving some of the volatile, taste bearing oils for foodstuffs and some of unstable plasma components in blood plasma.

It is another object of this invention to provide processes and apparatus for preserving biological substances such as bacteria and the like over long periods of time.

It is a further object of this invention to provide novel quick-freezing processes and apparatuses for biological substances.

Another object of this invention is to provide novel processes whereby frozen droplets of biological substances may be effectively thawed and rendered suitable for use.

Another object of this invention is to provide a novel combination of features whereby blood, body fluids, or fluidized tissues and other biological substances are quick-frozen, stored and thawed.

According to this invention, therefore, a process for the preservation of biological substances, such as blood, comprises introducing droplets of the biological substances into a moving film of a substantially inert liquid refrigerant having a temperature substantially below the critical temperature zone of the biological substances, whereby the droplets are quick-frozen; and storing the droplets frozen thereby in a liquid refrigerant at a temperature of —130° C. or lower. At the conclusion of said storage, the droplets are thawed. A very high percentage of survival has been found to result. In the case of blood, the red blood cell survival rate has generally been found to be substantially over 90%, and this, it should be noted, after almost indefinite, unlimited storage periods.

By "critical temperature zone" is meant that temperature zone, below the freezing point of a cell, through which the rate of cooling must be rapid enough to limit the time available for the degradative processes to occur. The essential factor is the time or duration of residence in the critical zone by the biological entity in question. During freezing (and thawing), it has been found that the biological substances must be introduced into a medium which provides a temperature differential sufficient to reduce the time spent in the critical zone to a level where the seriously damaging phenomena are held to a minimum. During freezing, storage and thawing any substantial residence of the cells in the critical temperature zone will lead to the rapid deterioration of the cells of the biological substances.

The critical temperature zone will vary according to the biological substance.

In the base of red blood cells the critical zone lies between the freezing point of the cell and about —50° C. In this zone the rate of cooling should be rapid enough to obtain a cell, after thawing, intact from the standpoint of its hemoglobin content. It is essential, therefore, that any freezing process employed during a process for the preservation of blood provide the necessary temperature differential to drive the temperature of the red blood cells rapidly down through the critical zone. It has been found that this has been uniquely effected by the process of this invention. Moreover, the combination of features, i.e., the moving film of liquid refrigerant, its essentially inert nature, and its low temperature, i.e., one substantially below the critical zone of the cells being frozen, plus storage of the latter in a liquid refrigerant at a temperature of below about —130° C. has resulted not only in the preservation of single viable red blood cells for unlimited periods of time, but has also resulted in the aforementioned very high recovery rate (over 90%) of red blood cells in any given volume of blood.

In the case of blood, the liquid refrigerant employed by the process of this invention must be a liquid below about —75° C., in order to insure adequate recovery of the red blood cells.

The refrigerant preferably employed in both the quick-freezing and storing steps is liquid nitrogen. Liquid nitrogen has the advantages of being relatively inert, safe to handle, and relatively inexpensive. It also has an exceedingly low boiling point. However, other refrigerants may also be employed. Among those liquids which may be used are liquid air (containing normal amounts of nitrogen), helium, neon, xenon, argon, krypton, nitrous oxide, paraffinic hydrocarbons containing up to and including 7 carbon atoms, and those fluorine and chlorine derivatives of hydrocarbons containing up to and including 5 carbon atoms which are liquid below about —75° C. For the purposes of illustration, the refrigerant hereinafter described is liquid nitrogen, although it is to be understood that any liquid refrigerant having the physical properties outlined above may be employed and that therefore, this invention is not to be limited to nitrogen exclusively as the liquid refrigerant. The liquid nitrogen employed can be obtained in the well-known rectification of air, although other means can also be employed.

This invention also provides a novel thawing process which comprises either introducing the frozen droplets into a constant temperature, moving or agitated aqueous bath or solution of polyvinylpyrrolidone in an NaCl solution held at a temperature of between 37 and 50° C., or introducing the droplets into steam. By these processes, the safe recovery of the frozen droplets is assured.

It is also within the scope of this invention, though less desirable, to have the droplets of the biological substances introduced into the moving film of liquid nitrogen or other suitable liquid refrigerant, thereupon to be followed by the introduction of the droplets frozen thereby into a moving or non-moving liquid thawing medium such as a standard isotonic saline solution. The latter standard thawing solution is especially applicable in the case of quick-frozen bacterial substances.

It is essential, for the practice of this invention, that the film of nitrogen be moving and not stationary.

It has been observed that when freezing biological substances by spraying drroplets of said substances into a stationary bath of liquid nitrogen, about 50% of the droplets coalesce and freeze into clumps and masses which adhere to the surface of the vessel and are too large to permit proper thawing. Proper thawing is essential because, as aforementioned, unless heat can be transferred to the frozen cells rapidly enough, serious loss by cell destruction will result. In this regard, the geometry of a frozen mass is a critical factor in the transmission of heat. The smaller the volume, the more quickly a temperature increase can be effected under given conditions. For these reasons, the freezing of fluids in droplet form in stationary surfaces of liquid refrigerants has been found to be unsatisfactory. The use, therefore, of a moving film of nitrogen avoids droplet aggregation, and results in a high-percentage yield of product which can be efficiently thawed.

In employing the freezing procedures of this invention, wherein droplets of the biological substances are introduced into a moving film of nitrogen, it is best to restrict the size of the droplets to not greater than about 2.0 mm. in diameter. This insures the desired rapid freezing. When freezing blood, a lower size limit of about 0.25 mm. is preferred in order to minimize red cell destruction by mechanical forces involved in the formation of small droplets. A particularly suitable droplet size for freezing and thawing whole blood is between 0.5 mm. and 1.5 mm. The latter range also enables the frozen blood to be rapidly thawed.

The film of liquid refrigerant, i.e., nitrogen, should be of sufficient thickness at the point of impact of the droplets to prevent penetration of the droplets to the walls containing the film. This is important to prevent the droplets freezing to the container walls. A film thickness of at least about ⅛ inch has been found sufficient to avoid this difficulty. It is preferred, however, to employ a film having a thickness of between ¼ inch and ½ inch. Thicker films, may, however also be used.

The velocity of the moving film of nitrogen relative to the stream of droplets should be at a rate of at least 26 mm./sec. This is essential to avoid contact between unfrozen and partially frozen droplets.

The rate at which the droplets are fed into the moving film of liquid nitrogen depends in part on the relative velocity of the film. At a relative velocity of 26 mm./sec. only about 13 droplets/second can be ejected onto the film of nitrogen in order to avoid contact between the successive droplets. The latter also represents a distinct hazard in any freezing operation since if an unfrozen droplet comes in contact with a partially frozen droplet, the two droplets will agglomerate into clumps too large for satisfactory thawing.

In a particularly preferred embodiment, droplets of blood are sprayed onto a linearly moving film of nitrogen about ¼ to ½ inch in depth, said film flowing at a rate of between 250 and 1100 mm./sec. The droplets are then carried to a point of collection where a suitable device, such as a sieve, sifts out the droplets too large for satisfactory thawing.

A particularly preferred thawing procedure comprises introducing the frozen droplets into an aqueous solution of polyvinylpyrrolidone, hereinafter also referred to as PVP, in an isotonic NaCl solution. It has been found that about a 7 percent solution of PVP in the NaCl solution is most preferable, although effective results are obtained when the PVP concentration lies between 1 and 10 percent. Hypotonic saline solution (containing somewhat less than 0.85% NaCl) may sometimes be employed when they are used together with additives such as PVP which modify the osmotic activity of the medium. Generally speaking, for normal size 500 ml. units of blood, about 15 ml. of the thawing solution is sufficient to initiate thawing. Care must be taken to keep the temperature of the frozen droplets below about −130° C., until contact with a constant-temperature thawing medium is effected. The thawing step should provide a moving thawing medium, which preferably comprises the aqueous NaCl solution of PVP indicated heretofore, and subsequently should comprise the PVP solution and thawed blood, which is maintained at a constant temperature of between about 37° C. and 47° C. Above about 47° C., it is possible that irreversible denaturation of protein will result.

The steps may be outlined as follows:

A. The blood obtained from a donor should be collected in a suitable anti-coagulant medium. Particularly suitable as such mediums are standard citrate-dextrose solutions or heparin solutions. This is a customary procedure presently in use for the preservation of whole human blood by refrigeration at about 4 to 6° C.

B. Upon collecting the drawn blood in a suitable anticoagulant, a protective additive should be added thereto. Among those additives particularly suitable are glucose and lactose. If glucose alone is used as the protective additive, then sufficient should be added to achieve a final concentration of 4 to 7 percent. The glucose may be added in aqueous solution either to whole blood directly or to the separated plasma. The latter may then be recombined with the cellular constituents prior to freezing.

Lactose may be added to the collection bottle prior to drawing the blood from the donor so that a final concentration of about 11 percent lactose will be achieved in the whole blood.

C. After the additive has been added the resulting blood mixture should be stored for a period of time sufficient to achieve an osmotic equilibrium between the cells and the plasma. The time required for an additive such as glucose to enter the red cell in an amount sufficient to provide protection will vary inversely with the amount added. In the preferred embodiment of this invention, the blood-additive mixture should be stored at a temperature of between about 4° C. and under 37° C. for at about one hour prior to quick-freezing. Longer periods, however, even 48 hours or more, have been satisfactory under some circumstances.

With additives such as lactose which do not penetrate the red cell, storage periods of less than one hour, as for example, 30 minutes, may suffice to achieve the desired osmotic equilibrium between the cells and their environments.

D. Following the storage step, the blood-additive mixture should then be subjected to the quick-freezing procedures of this invention.

E. After freezing the droplets of the blood and collecting the same in a suitable container, the frozen droplets should be stored at a temperature below that at which the cellular contents of the red blood cells will be harmfully affected.

By "harmfully affected" is meant damaging the red blood cells so that they are not in the state they were at the beginning of the storage period. Damage can result from rapid crystal growth, ice crystal growth, the concentration of salts which degrade cellular protein and the like. It has been found that storing the frozen cells at temperatures of below about −130° C. in a refrigerant, will render cell damage negligible from the above and other causes. At temperatures of above about −130° C., on the other hand, the possibility of cell damage is no longer negligible and increases as the temperature of storage rises. That is to say, at −70° C. the rate of cell damage will be higher than at −100° C., and so on. As a consequence, thereof, the period of safe storage of blood will be severely restricted. While it is possible to safely store blood for limited periods of time at temperatures of above −130° C., it has been found that at temperatures of about −130° C. and below (preferably the latter), there appears to be no practical limit to the time period of storage. In this regard, it is distinctly possible to contemplate the storage of undamaged blood for decades or more.

While liquid nitrogen is preferred for storage purposes for the reasons aforementioned, it is quite within the scope of this invention to employ any refrigeration method that will maintain a temperature below that at which the cellular contents of the red blood cells will be harmfully affected.

F. After storage, it is necessary to thaw the frozen droplets prior to use. It is important that the thawing be accomplished quickly and yet without harming the cells. In the practice of this invention, the novel thawing procedures previously discussed are preferred.

In the processing of blood which is to be used for transfusion it is necessary to maintain sterility throughout the process. Thus, all apparatus which comes in contact with the frozen and unfrozen blood must be sterilized and maintained under sterile conditions. In this invention, in order to maintain sterility, the liquid nitrogen refrigerant was rendered bacteria-free by filtration through an ultra-fine cellulose filter. More particularly a filter was provided which excluded substances having a critical diameter greater than 0.5 micron. A filter which has proved particularly satisfactory for the sterilization of liquid nitrogen is made by the Millipore Filter Corporation and sells under the trade name Millipore filter HA. However, any similar or otherwise suitable filter, or the like, may be employed.

The apparatus which comes in contact with the blood may be sterilized by any effective method. The smaller components of the equipment may be autoclaved to achieve sterility. Those components too large for satisfactory autoclaving may be satisfactorily sterilized by repeated washings with antiseptic solutions such as phenol or by exposure to ultra-violet radiation or steam.

Body fluids, in addition to blood, which can be frozen, stored and thawed by this invention include bone marrow, serum which is blood with the cells and fibrinogen removed, blood plasma fractions, spinal column fluids, and the like.

Blood and other body fluids must be handled and stored under sterile conditions even when frozen, because bacteria caught and suspended at low temperature will survive the thawing procedure and contaminate the thawed fluid.

By this invention also, microorganisms including, for example, bacteria, beverages and other biological substances may also be preserved. Among those microorganisms effectively preserved were:

*Azotobacter vinelandii*
*Escherichia coli*
*Micrococcus pyogenes*
*Aspergillus niger*
*Saccharomyces* sp. (yeast)

Standard liquid media were employed in growing these microogranisms which were then frozen, each in its own growth medium, under the conditions and processes of this invention. The organisms could be suspended, however, in aqueous media containing protective additive substances such as glycerol, glucose, lactose, or polyvinyl pyrrolidone, or combinations of these. Freezing may be carried out in the same manner. Similarly, the organisms may be suspended in any medium suited to a desired end use and frozen by these processes.

The thawing method employed with frozen microorganisms generally comprises introducing the frozen droplets into a standard isotonic saline solution held at 37° C., with stirring, followed by collection through any suitable means.

Similarly, orange juice, beer, wine and the like have been quick-frozen following the novel quick-freezing processes of this invention. In this manner and following standard lyophilizing (or drying in the frozen state) methods, dried droplets were obtained after freezing and storing which could be reconstituted by water or water and ethyl alcohol. These substances can, of course, be stored or transported in the deep-frozen state and thawed as desired with any or all of the original water and alcohol content left intact.

Therefore, in the drawings:

FIG. 1 is a view in section of an embodiment according to the invention, in the form of a cascade droplet freezing apparatus;

FIG. 2 is a section view, on an enlarged scale, of a droplet sieve without screens;

FIG. 3 represents a schematic view of another embodiment according to the invention, in the form of a collection container.

Figure 4:
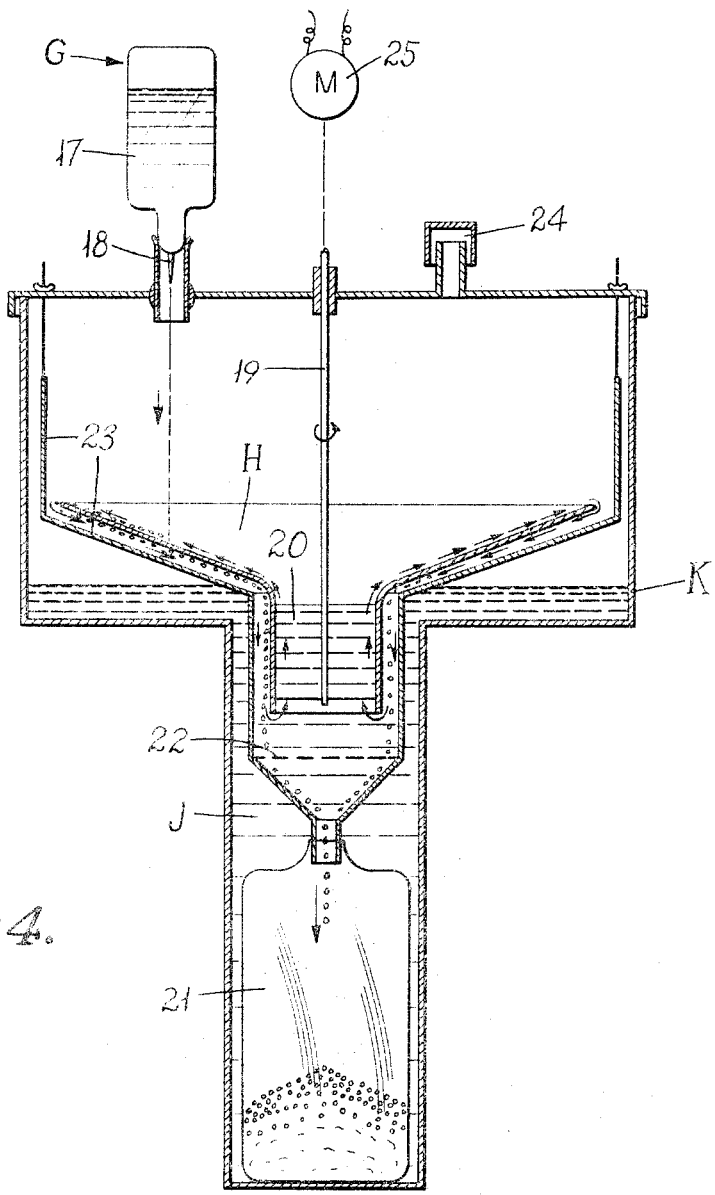
FIG. 4 is a sectional view of another embodiment according to the invention, in the form of a centrifugal film freezer.

Referring now to the drawings and particularly to FIG. 1 which shows a freezing apparatus which is hereinafter referred to as the cascade apparatus. Shown generally at A is a delivery apparatus. Indicated at B is a tray section including a series of trays to carry liquid refrigerant. Indicated at C is a sieving device for separating the frozen droplets. Indicated at D is a droplet collection vessel. Indicated at E is a lower reservoir, and indicated at F is a series of pumps to recirculate the liquid refrigerant back over the trays.

The delivery apparatus A is an example of a suitable droplet feeder and includes a delivery bottle 1 connnected through a filter 2 to a spray nozzle or nozzles 3. The delivery bottle is provided with an air inlet 4 for connection to a sterilized or filtered air supply means when the operation requires that a light positive pressure be maintained in the bottle. The aforementioned filter at 2 communicates with a valve and a manifold 5 having a plurality of openings, each adapted to receive a spray nozzle 3 which may for example be a hypodermic needle, or a plastic or glass capillary tip. The spray nozzles 3 are positioned above an uppermost liquid refrigerant tray 6 of the tray section B and at a sufficient distance above the tray so that the liquid to be frozen will form droplets prior to striking the freezing medium. Suitable distances between the tip of the spray nozzles 3 and the refrigerant are in the range of 9 inches to 12 inches for most substances, whereby droplets ranging in size from .5 mm. to 1.5 mm. are formed. The distance may be altered, however, to correspond to the size of the aperture of the spray nozzles and the size of the droplets to be formed for freezing.

Section B consists of an initial tray 6 which receives the freezing medium, at least one weir 7 to provide a cushion of liquid refrigerant of adequate depth on the trays, i.e. a depth of about ¼ to ½ inch, a cascade 8 beneath the weir, and a series of inclined trays 9 to conduct the liquid freezing medium linearly over a distance of preferably at least 30 inches, to the sieving device C which is employed to remove frozen droplets to the collection vessel D. The liquid nitrogen is then pumped by means of pump F to the upper reservoir 10 and recirculated.

The sieving device C as depicted in FIG. 1 may contain two or more screens. An upper screen 11 discards the frozen droplets too large for satisfactory rapid thawing or drying into an oversize collection cup 12 and the lower sieve 13 which is normally laterally inclined, and rapidly vibrated, is employed to conduct droplets into the collection container D. However, a double screening device may not be necessary for application where the size of a droplet is not critical. Alternatively, other collection devices may be used with and without screens. For example, a collection vessel D may be placed in the lower reservoir E in the freezing medium and the droplets separated by gravity by allowing the freezing medium to overflow from the collection vessel into the lower reservoir. The latter alternative is shown diagrammatically in FIG. 2, wherein the collection vessel D is positioned to receive the droplets from the suitable droplet sieve 13.

Where the material being frozen must be maintained in a sterile condition, as for example, whole human blood, the collection vessel or container D, is adapted to be sealed under sterile conditions. FIGURE 3 illustrates a sterilized collection vessel.

The vessel or container depicted in FIG. 3 is adapted to contain frozen droplets plus some sterilized liquid refrigerant. Said collection vessel is equipped with a lid 14, as shown. The lid is placed over the container while within the freezing apparatus, preferably by remote control. The container is then withdrawn from the freezing apparatus to be put into storage. The container is also equipped with a filter disc 15 situated in a vent 16 which effectively removes bacteria. Pressure resulting from evaporation of the stored liquid refrigerant is relieved through said filter disc. The atmosphere of the storage vessel can only pass into said container through the filter 15. Thus, sterility is maintained within the container without the necessity of sterilizing the storage atmosphere.

Returning again to FIGURE 1, the pump or pumps F raises the liquid freezing medium from the lower reservoir E to the upper reservoir 10 whereby the freezing medium overflows and "cascades" down the series of trays.

The apparatus shown in FIGURES 1 and 2 may optionally be enclosed in a two-compartment plexiglass or other suitable material enclosure equipped with ultraviolet lamps to assist in sterilizing the interior of the enclosure. In addition, defrosters may be provided to aid in viewing the working parts of the apparatus. These modifications are useful but not essential, however. For some applications, where cleanliness and not absolute sterility is required, the apparatus may be open. If sterility is required in a particular application, such as the preservation of pure biologicals, then any enclosure suitable to maintain sterile conditions may be used. The delivery apparatus may optionally be inside or outside the enclosures. If the delivery apparatus is outside the enclosure, then care should be taken to achieve and maintain a positive pressure inside the enclosure prior to and after the insertion of the spray nozzles. Suitably a puncturizable opening of rubber, plastic, or other material may be provided in the enclosure wall to receive a needle-like spray nozzle under sterile conditions. One such apparatus is a plastic or rubber strip over an opening in the enclosure through which a sterile, plastic-encased needle may be inserted.

The apparatus depicted in FIGURES 1 and 2 is useful to freeze liquids or liquid suspensions in droplets of varying size. As described heretofore, in freezing whole blood without employing an excessive amount of additives, it has been found necessary to freeze rapidly. Ultra-rapid freezing can normally only be attained by freezing in large surface area masses, such as thin films or small droplets. This apparatus however, permits freezing units of blood of about 500 ml. conveniently and with a minimum of hemolysis.

The apparatus is useful also for the preservation of other biologicals such as microorganisms, liquid suspensions of viable animal or plant tissue, and medicinals. For example, using liquid nitrogen as the freezing medium, a liquid suspension of bacterial, *Escherichia coli*, has been frozen in droplets using this apparatus, stored at about −195° C. and rapidly thawed in a 0.85 percent NaCl bath at 37° C., with good results.

In addition, this apparatus may be used to freeze fluidized food or beverages such as milk, orange juice, beer, wine, etc. in the form of small droplets which have a high surface-to-volume ratio and may thus be more rapidly dried than by conventional freeze-dry methods.

A centrifugal film freezer is shown in FIG. 4. The main elements are a delivery apparatus G, containing a suitable pressurizing connection, a funnel-shaped rotatable disc H having the cone of the funnel in a bath of liquid refrigerant J, a liquid refrigerant reservoir K and a collection vessel 21.

The delivery apparatus G may consist of pressurizable container 17 and liquid delivery means to a droplet forming spray nozzle 18 positioned a sufficient distance above the funnel-shaped disc to allow the formation of droplets prior to their falling onto the moving film of liquid refrigerant medium. The delivery apparatus may be any suitable reservoir connected to a spray nozzle which may be a hypodermic needle or a plastic or glass capillary tip.

The lower portion of the funnel-shaped disc H is rotatably suspended in the liquid refrigerant reservoir K by a centrally located shaft 19 driven by an overhead positioned motor 25 connected to the lower portion of the funnel by radial fins or spider 20. When rotated, the liquid refrigerant is drawn up by centrifugal force through the interior lower portion or neck of the funnel and thrown radially outward and over the outer rim of the funnel-shaped disc. At this point its direction is reversed and it flows down the stationary funnel-shaped guiding surface 23 back to the center. Droplets falling into this moving refrigerant film are rapidly frozen and subsequently carried by the circulating refrigerant to the point of collection.

The frozen droplets may be collected as shown in the drawing in a container 21 immersed in the refrigerant below the funnel-shaped disc. Alternately the droplets may be collected from the outermost upper rim of the funnel by a screening device or sieve 22 allowing continuous operation. If the collection point is changed, it is still desirable to have the stationary guiding surface 23 to conduct the refrigerant back to the center of the funnel.

If sterile conditions are necessary, then the apparatus should be enclosed as shown in the drawing. Again, however, this is optional. Where a boiling gas, as liquid nitrogen, is used as the refrigerant, it is necessary to vent the enclosure. In this regard, a vent 24 is shown. Positive pressure inside the enclosure will aid in maintaining sterility.

As pointed out above, the lower portion of the funnel-shaped disc H with the radial fins 20 effects a drawing up of the refrigerant onto the funnel surface where the refrigerant is caused to flow radially outward by centrifugal force. In the apparatus shown the funnel was about 11 inches in diameter with a slope of 2½ inches from the 3-inch diameter lower portion. The action of funnel H is effective with any slope from horizontal to vertical.

Figure 5:
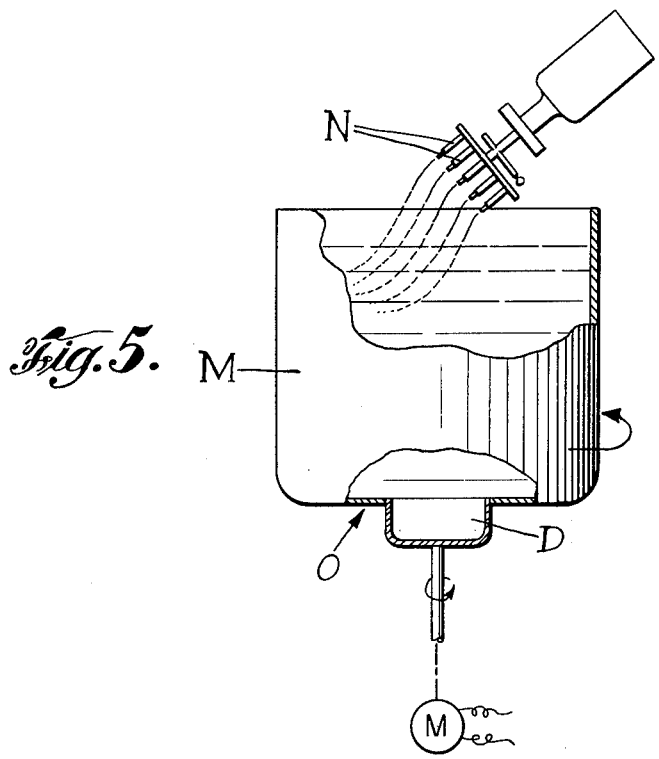
FIG. 5 is a schematic view of another embodiment according to the invention, in the form of a centrifuge freezer.

A centrifuge type freezer is shown in FIG. 5. This droplet freezing apparatus consists of a rotatable drum M containing the refrigerant medium and a series of spray nozzles N directed toward the film of liquid nitrogen which is caused to form on the interior wall of the drum by rapid rotation of the drum. The spray nozzles N are positioned a sufficient distance from the wall of the drum so that droplets will be formed and will fall into the moving liquid nitrogen film. Rapid rotation of the drum causes the nitrogen to climb up the wall and form a film. The spray nozzles are directed toward this film. After all the fluid has been frozen the rotation is stopped and the frozen droplets sink into the collection area O. The collection cup D is placed in this area prior to the freezing operation.

The delivery bottle, filter, manifold, and spray nozzles are similar to or the same as previously described for the cascade freezer.

Figure 6:
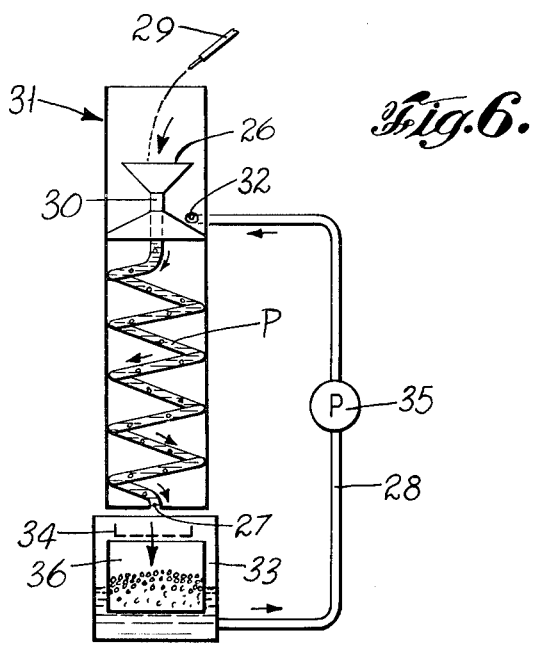
FIG. 6 is a schematic view of another embodiment according to the invention, in the form of a helical tube freezer.

FIGURE 6 shows a helical tube freezing unit which includes a helical tube P having an upper opening 26 and a lower opening 27 and means 28 for circulating liquid refrigerant through the helical tube. A spray nozzle 29 is positioned above the upper flanged opening so that droplets of the material to be frozen fall into the downwardly spiraling liquid refrigerant.

As shown in the drawing, the upper end 30 of the helical tube extends through the bottom of a cylindrical container 31 which contains one or more tangential openings 32 to receive liquid refrigerant. A vortex is thereby formed in the cylindrical container or chamber 31 thereby filling the helical tube with rapidly moving liquid refrigerant. A lower reservoir 33 contains a sieving device 34 adapted to retain the oversize droplets and to permit the correct size droplets to fall into the collection cup 36. A liquid refrigerant medium is recirculated through the spiral by a pump 35 from the lower reservoir 33 to the aforementioned cylindrical container 31.

Figure 7:
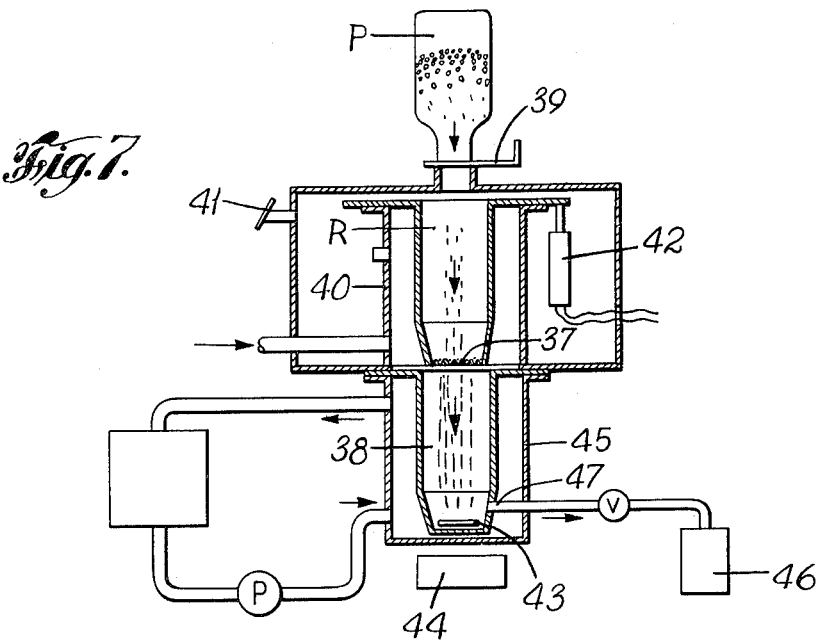
FIG. 7 represents a schematic view of another embodiment according to the invention, in the form of a steam circulation thawing apparatus.

A schematic drawing of a "forced circulation" thawing apparatus is shown in FIG. 7. This apparatus consists of a delivery bottle P, a cooled droplet container R, a sifting device 37 and an aluminum vessel 38 in a constant temperature bath.

The delivery bottle P is inverted over the cooled droplet container R and is adapted to be opened and closed by sliding gates 39 to allow the frozen droplets to fall into the cooled droplet container.

The cooled droplet container shown in FIG. 7 is jacketed and adapted to have a liquid refrigerant or cold gas circulated between the jacket 40 and the container R. The jacket and droplet container are enclosed in a vented enclosure. The refrigerant leaving the jacket is connected to the vent or vents. The vents are represented by 41. The cooled droplet container is attached to a vibrator 42 which functions to sift the frozen droplets through the screened bottom 37 of the cooled droplet container R into the thawing vessel 38.

The thawing vessel 38 is a substantially cylindrical aluminum vessel having a magnetic stirring rod 43 in the bottom and magnetic stirrer 44 underneath to stir the thawing medium. The thawing vessel contains a jacket 45 and is adapted to have a constant temperature fluid circulated between the jacket and the thawing vessel. As shown in the drawing, the aluminum vessel is also provided with a lower outlet 47 for collection of the thawed blood in a collection bottle 46.

Instead of the magnetic stirring arrangement, the aluminum vessel may be adapted to be rotated in a constant temperature bath.

Figure 8:
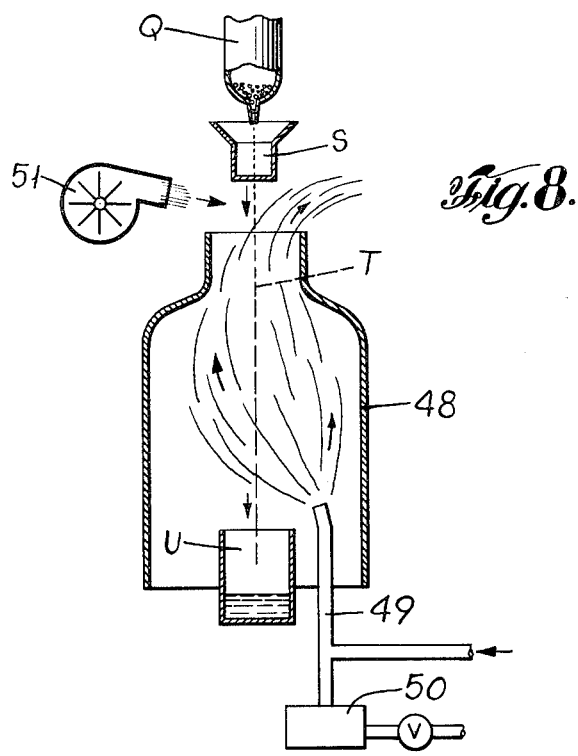
FIG. 8 represents a schematic view of another embodiment according to the invention, in the form of a steam thawing apparatus.

A steam thawing column is shown in FIG. 8. It consists of a cooled droplet container Q, a cooled droplet delivery funnel S, a steam column T, and thawed blood collection container U. The frozen droplets of blood are shaken out of the container and allowed to fall through a cooled funnel into an ascending column of steam preferably about 8 inches in length. The steam column is in the form of a tube 48, preferably about 4 inches in diameter. Atmospheric or sub-atmospheric pressure steam is introduced into the lower portion of the tube by a steam delivery tube 49 equipped with a condensate trap 50. The steam is preferably blown away from the upper end of the column with an air blower 51 to prevent prematurely warming the frozen droplets. A collection vessel or container U is positioned below the steam column to collect the thawed blood. This collection vessel may optionally contain an aqueous solution of 7% PVP and 0.8% NaCl at about 50° C.

It is essential that the dwell-time of the droplets in the steam be extremely short, and preferably no more than 0.1 second where atmospheric steam is employed.

It should be noted that the aforementioned freezing apparatus represented in FIGURES 1, 4, 5 and 6 each have uses for which they are particularly adapted. Hence, the cascade apparatus permits processing a greater bulk of material per unit time than do the other type freezers, while still maintaining sterile conditions. It also permits the grading of the frozen droplets according to their size. Finally, slight changes in the design of this apparatus permits the process of this invention to be run as a continuous rather than batch process. This, of course, presents additional advantages.

The centrifugal film freezer has the advantage of not requiring a pump to produce its flowing film. Moreover, its simplicity and compact size permits sterilization of the entire unit in an autoclave. It is especially adaptable, therefore, to laboratory use, to a greater degree than the cascade freezer. Moreover, the flow of nitrogen across the freezing surface can be varied at will. This affects the freezing rates and represents another difference between this apparatus and the cascade and helical freezers. In the latter two freezers, the cooling rate is substantially non-variable.

The helical freezer's main advantage lies in its simple, economical structure. It is especially suitable for small-scale operations where sterility is no object. It is also especially adaptable and well-suited to rapid changes from one biological material to another.

The liquid centrifuge freezer of FIGURE 5 has the specific advantage of offering the largest effective freezing surface for incoming droplets by virtue of its perpendicular and rotating wall of liquid nitrogen. This freezer also provides a variable cooling rate. In this regard also, it offers the fastest freezing rate of the four freezing apparatus. This freezer appears to be especially useful in processing large volumes of fluids in droplet form for subsequent freeze-drying.

The following examples illustrate the processes of this invention. They are for illustration purposes only and are not intended to limit the invention thereto.

A. PRESERVATION OF BLOOD

*Example 1*

Human blood (227.5 ml.) was drawn into a collection bottle containing 62.5 ml. of a standard citrate-dextrose anti-coagulant medium, hereinafter referred to as an ACD medium. This medium comprises 2.45 gm. dextrose U.S.P.+2.20 gm. sodium citrate U.S.P.+0.80 gm. citrate acid U.S.P. per 100 ml. aqueous solution. The cellular components were separated from the plasma by centrifuging. To the plasma was added a glucose solution containing 0.53 g. of glucose in physiological saline solution. The solution was added at a rate of 15 ml. per 105 ml. of original collection volume or 41.5 ml. in all. This gave a glucose concentration of approximately 6.5% by weight after the cells had been recombined (specific gravity of final blood suspension being approximately 1.08).

The blood was then held overnight at 4° C. The next day the blood was sprayed by means of a droplet-making jet (at 5 p.s.i. pressure) onto a linearly moving film of liquid nitrogen about ¼ inch thick. The blood was thereby frozen in this manner. The velocity of the film was about 1100 mm./sec. The path taken by the droplets was such that for a period of about 1.5 seconds the possibility of contact between them was minimized. To accomplish this, the cascade apparatus was employed. The droplets were collected and sieved (at liquid nitrogen temperature) to exclude droplets less than 0.25 mm. and over 1.5 mm. in diameter. They were then stored in a liquid nitrogen refrigerator at −196° C. overnight.

The frozen droplets (60 ml.) were then thawed by removing them from the liquid nitrogen container and feeding them gradually into an aluminum pan rotating at about 42 r.p.m. in a water bath held at 47° C. and containing 15 ml. of 7 percent PVP in an isotonic NaCl solution.

Free hemoglobin analysis of the thawed preparation showed 98 percent of the cells survived the freezing, storage, and thawing cycle. Before freezing the ratio of cell volume to total volume was 0.269. After thawing, this ratio was 0.22. Primarily this reduction in ratio was due to dilution by the PVP medium.

*Example 2*

The above procedure was followed exactly with this exception: Prior to the freezing step the glucose solution was added directly to the whole blood. This was done by slowly adding the glucose solution over a period of about 10 minutes to the whole blood and gently agitating to insure mixing.

Following thawing, 97 percent of the cells were found to have survived the freezing, storage, and thawing cycle. Before freezing the ratio of cell volume to total volume was 0.247. After thawing this ratio was 0.20.

*Example 3*

VARYING GLUCOSE CONCENTRATION

Following the procedure of Example 1, aliquots of blood were treated with varying amounts of glucose and frozen in droplet form in liquid nitrogen. The results are shown in items A–E below. A separate portion received no glucose additive (only the glucose from the anti-coagulant being present) and was frozen within a few hours of collection. This is represented by item F. Another specimen of blood was treated with glucose following the procedure of Example 2. This is represented by item G below. An aliquot of this also received no glucose additive and was frozen within a few hours of collection. This is represented as item H. To determine the amount of cells surviving, representative portions of the various preparations were thawed in 15 ml. of 7 percent PVP in 0.85 percent NaCl, as described in Example 1. The results are summarized below.

| Item | Preparation Whole Blood Plus, Percent Gluc. | Volume Frozen, ml. | Length of Time Stored at −196° C. (approx.) | Volume Thawed, ml. | Percent Red Cells Surviving (Hemoglobin Analysis) |
|---|---|---|---|---|---|
| A | 2.6 | 50.5 | Few hrs | 1.5 | 93 |
| B | 2.9 | 51.5 | do | 1.5 | 93 |
| C | 4.0 | 52.5 | 72 hrs | 1.5 | 95 |
| D | 4.6 | 53.6 | Few hrs | 1.5 | 96 |
| E | 8.2 | 56.3 | 72 hrs | 1.5 | 97 |
| F | 0.5 | 100 | Few hrs | 1.5 | 85 |
| G | 6.0 | 40 | 48 hrs | 1.0 | 98 |

Example 4

VARYING CONCENTRATION OF PVP IN THAW MEDIUM

Following the procedure of Example 1, blood was treated with glucose to achieve a concentration of 6 percent. This was thereupon frozen in droplet form. A separate portion received no added glucose and was frozen within a few hours of collection. Thawing was carried out by the procedure given in Example 1 except that the concentration of PVP was varied, as shown below:

| Composition Thawing Medium, 0.85% NaCl Plus— | Red Blood Cell Survival (Percent) | |
|---|---|---|
| | Whole Blood | Whole Blood +6% Glucose |
| 0% PVP | 65 | 91 |
| 2% PVP | 73 | 92 |
| 4% PVP | 76 | 94 |
| 6% PVP | 82 | 95 |
| 8% PVP | 89 | 97 |
| 10% PVP | 93 | 98 |

Example 5

LACTOSE AS A BLOOD ADDITIVE DURING FREEZING AND THAWING

Lactose (32.4 grams) was added to 67.5 ml. of ACD anti-coagulant in a blood collection bottle. Human blood was drawn into this, with occasional gentle agitation, until a volume of 290 ml. was reached. A few hours later the blood was frozen as described in Example 1.

After holding for about an hour at about −196° C. in liquid nitrogen, 30 ml. of frozen droplets were thawed as described in Example 1.

On analysis for free hemoglobin, 96 percent of the original cells were found intact. Lactose, a disaccharide, is thus shown to be capable of providing a degree of protection to red cells during freezing and thawing. A transfusible product is obtained on the basis of the amount of free hemoglobin in the thawed product.

Example 6

BLOOD FROZEN WITHOUT ADDITIVE

Approximately 200 ml. of human blood was collected in a plastic blood collection bag containing about 50 ml. of ACD anti-coagulant. Eight ml. were frozen as described in Example 1.

The frozen droplets were stored in liquid nitrogen for three days.

Thawing was carried out as described in Example 1. Two representative samples of about 1 ml. each were thawed. Following thawing, free hemoglobin was determined. It was revealed that 14 percent of the cells had been destroyed.

Example 7

CENTRIFUGAL FILM FREEZER

To 105 cc. of whole blood containing 22.6 cc. of ACD anti-coagulant (composed of 4.8 g. citric acid, 14.7 g. dextrose and 13.2 g. trisodium citrate diluted to 1000 cc.) there was added 15 cc. of an aqueous solution containing 44 percent glucose and 0.85 percent sodium chloride. The blood was carefully mixed and allowed to stand in a cold room at 4° C. for 24 hours.

A portion of this blood was placed in a glass container equipped with a drawn glass capillary tip which produced a fine stream of blood droplets of about 1.5 mm. in diameter. An air pressure of about 6 inches mercury was applied to the blood through an inlet above the blood level in the above-mentioned container. The capillary tip was placed about 14 inches away from the site of impact of the droplets on a liquid nitrogen film in a centrifugal film freezer. About 50 cc. of the blood was frozen in the centrifugal film freezer which was rotated at 600 r.p.m. The maximal velocity of the liquid nitrogen film was about 4000 mm./sec. The film thickness was 3 mm. After freezing, the droplets were screened under liquid nitrogen to obtain the droplets below 1.5 mm. diameter. This fraction amounted to 99.5 percent of the total. These frozen droplets were thawed by dropping them into an aluminum dish which contained an aqueous solution of 7 percent PVP and 0.85 percent NaCl, while the aluminum dish was rotated on a water bath.

Analysis of the thawed blood showed its plasma to contain 7 percent free hemoglobin, indicating that the red blood cells still contained 93 percent of the total hemoglobin after the freezing and thawing operations.

Example 8

HELICAL FREEZER

To 105 cc. of whole blood containing 22.6 cc. of ACD anti-coagulant (composed of 4.8 g. citric acid, 14.7 g. dextrose and 13.2 g. trisodium citrate diluted to 1000 cc.) there was added 15 cc. of an aqueous solution containing 44 percent glucose and 0.85 percent sodium chloride. The blood was carefully mixed and allowed to stand at 4° C. for 24 hours.

A portion of this blood was placed in a glass container equipped with a drawn glass capillary tip which produced a fine stream of blood droplets approximately 1.5 mm. in diameter when an air pressure of about 6 inches Hg was applied to the blood. The air pressure was applied through an inlet situated above the blood level in the above-mentioned container. The capillary tip was placed about 14 inches away from the site of impact of the droplets on the liquid nitrogen vortex (which was 3 mm. or more in depth) in a helical freezer. About 50 ml. of the blood was frozen in this manner with the liquid nitrogen and the droplets descending under gravitational acceleration. After freezing, the droplets were screened under liquid nitrogen to obtain the fraction of frozen droplets below 1.5 mm. diameter. These droplets were thawed by dropping them into an aluminum dish containing an aqueous solution of 7 percent PVP and 0.85% NaCl, while said aluminum dish was rotated on a water bath at 50° C.

Analysis of the thawed blood showed its plasma to contain 7 percent free hemoglobin, indicating that the red blood cells still contained 93 percent of the total hemoglobin after the freezing and thawing operations.

Example 9

THAWING IN STATIONARY VS. ROTATING MEDIUM

To 80 ml. of whole blood collected in an ACD medium there was added 20 ml. of 1.5 M glucose in 0.85 percent NaCl. This preparation was allowed to equilibrate at 4° C. for four hours. Freezing was carried out by spraying droplets on a moving film of nitrogen following the procedure outlined for the cascade freezer. The droplets were held in liquid nitrogen. About 10 ml. were removed and thawed in an aqueous solution of 7 percent PVP in 0.85 percent NaCl within an hour or two after freezing. Thawing was carried out in a rotating container at 47° C. Analysis for free hemoglobin showed 94 percent of the cells intact.

The remainder of the frozen material was stored for 49 days in liquid nitrogen. About 60 ml. of frozen droplets were removed and thawed in two equal portions (about 30 ml. each) as follows:

(1) In a rotating medium as described above.
(2) In a stationary container holding the same volume of medium (about 25 ml.), the droplets being added at the same rate as in (1).

Free hemoglobin analysis showed red cell survival in the rotating medium was 94 percent; in the stationary or non-rotating medium, 79 percent.

*Example 10*

DRUM (LIQUID NITROGEN CENTRIFUGE) FREEZING OF BLOOD

To 210 ml. of human blood collected in an ACD anticoagulant there was added 30 ml. of a 44 percent glucose solution. This preparation was allowed to equilibrate at 4° C. for about 6 hours. One 50 ml. aliquot was frozen in the cascade freezer in droplet form. Another 50 ml. aliquot was frozen in the liquid nitrogen centrifuge in droplet form. In the latter, the nitrogen film thickness was greater than 3 mm. in depth and the film velocity was about 2800 mm./sec. The droplet stream was directed tangentially to the film.

The frozen droplets were stored overnight in a liquid nitrogen refrigerator at about −196° C.

The next day specimens of comparable droplet diameters (0.7–0.86 mm.) from each of the freezing procedures were thawed as described in Example 1.

Analysis for free hemoglobin in the thawed material gave the following results:

(1) Specimen frozen in liquid nitrogen centrifuge 96% survival.
(2) Specimen frozen in cascade freezer 97% survival.

*Example 11*

STEAM THAWING

To 263 cc. of whole blood containing ACD anti-coagulant there was added 37.5 cc. of an aqueous solution containing 44 percent glucose and 0.85 percent sodium chloride. Thereby, a final concentration of 6 percent glucose in the blood was obtained. After equilibration and freezing in droplet form in a cascade freezer, the frozen droplets were screened to obtain the fraction of droplets with diameters less than 1.5 mm.

About 10 cc. samples of these droplets were thawed by dropping them as individual droplets through an eight-inch high column of steam, where they were, during their fall, momentarily exposed to steam at 100° C. and atmospheric pressure. Immediately after exposure to steam, the blood droplets were collected in a dish containing about 5 cc. of an aqueous solution of 7 percent PVP and 0.85 percent sodium chloride kept at 50° C. Analysis of the thawed blood indicated that the red blood cells contained 89 percent of the total hemoglobin.

*Example 12*

SUSPENSION OF RED BLOOD CELLS IN PVP

Another procedure may be used for the preservation of red blood cells which have been separated from their usual plasma medium. This process involves the separation of the cells from the plasma by centrifugation and resuspending them in PVP prior to freezing. The process is useful to obtain high survival of rare blood types to be preserved for extended periods of time.

One pint of blood collected in ACD anti-coagulant was centrifuged and the supernatant plasma drawn off. The packed cells were washed with an aqueous solution of 7% PVP in a 0.85 percent NaCl solution. The cells were again packed by centrifugation and the wash fluid drawn off. The cells were then resuspended in an amount of PVP solution equal to the original volume of plasma. Freezing was carried out employing the cascade freezer. The frozen droplets were collected, their diameters ranging from 0.55 mm. to 1.17 mm., and stored in liquid nitrogen for four days.

A representative sample was then thawed by allowing the droplets to fall into a constantly agitated medium consisting of 7% PVP in 0.85% NaCl. The temperature of the medium was held at 47° C.

Analysis for free hemoglobin showed 95% of the cells were intact.

*Example 13*

A quantity of blood frozen according to the process described in Example 1 was stored in liquid nitrogen at a temperature of −196° C. for a period of twenty months. Upon thawing in a 7% PVP solution in 0.85% NaCl held at 47° C., the quantity of blood recovered was examined. The recovery of red blood cells was found to be 96%.

B. PRESERVATION OF MICROORGANISMS

Suspensions of microorganisms may also be preserved by the droplet freezing and thawing process of this invention. The following examples are illustrative of this aspect of the invention.

*Example 14*

A 16-hour development (200 ml.) of *Azotobacter vinelandii* was prepared in Burk's medium (liquid) (1 percent inoculum, incubated with shaking at 30° C.). An aliquot was diluted ($10^{-6}$, $10^{-7}$), plated in duplicate at each dilution, incubated at 30° C. for 48 hours on a Burk's solid medium, and counted for viable organisms per ml. of undiluted specimen, which is represented as the initial concentration of organisms.

*Example 15*

A 40 ml. aliquot of the undiluted Azotobacter suspension was subjected to freezing as droplets by the "Helix" or helical tube freeze procedure. Approximately 10 ml. liquid volume of frozen droplets was thawed with stirring in 40 ml. of isotonic saline (0.9% s./v.) held at 37° C. Aliquots of the thawed preparation were diluted to $10^{-6}$, plated in duplicate, incubated at 30° C. for 48 hours on Burk's medium (solid), and counted for viable organisms per ml. of undiluted specimen. This last is represented by the post freeze-thaw concentration of organisms. Percent survival was calculated as in Example 13.

*Example 16*

A 40 ml. of aliquot of the undiluted Azotobacter suspension was subjected to freezing as droplets by the "centrifuge" procedure. Thawing and assay of surviving organisms were carried out exactly as in Example 14 above.

*Example 17*

A 40 ml. aliquot of the undiluted Azotobacter suspension was subjected to freezing as droplets by the "Cascade" freezer procedure. Thawing and assay of surviving organisms was carried out exactly as in Example 14 above.

*Example 18*

A 40 ml. aliquot of the undiluted Azotobacter suspension was subjected to freezing as droplets by the "Centrifugal Film" freezer procedure. Thawing and assay of surviving organisms were carried out exactly as in Example 14 above.

The following table illustrates the results obtained in Examples 14, 15, 16, 17 and 18.

| Ex. | Freeze Method | Thaw Method | No. Viable Organisms of *Azotobacter vinelandii* (in Burk's medium)/ml. | Percent Survival |
|---|---|---|---|---|
| 14 | None | None | $9.0 \times 10^7$ | |
| 15 | Helix | Warm Water (37° C.) | $3.3 \times 10^7$ | 37 |
| 16 | Centrifuge | do | $2.5 \times 10^7$ | 61 |
| 17 | Cascade | do | $2.5 \times 10^7$ | 28 |
| 18 | Centrifuge film | do | $1.8 \times 10^7$ | 20 |

A 16-hour development of *Escherichia coli* (200 ml.) was prepared in Tryptose Broth (Difco) (1% inoculum, incubated 30° C.). Aliquots were frozen, thawed, and assayed as in Examples 14, 15, 16, 17 and 18 above with the single exception that viable cell counts were made on Nutrient Agar (Difco) incubated at 37° C. for 24 hours in each case. The resulting text examples are given below:

| Ex. | Freeze Method | Thaw Method | No. Viable Organisms/ml. | Percent Survival |
|---|---|---|---|---|
| 19 | None | None | $9.3 \times 10^8$ | |
| 20 | Helix | Warm Water (37° C.) | $8.8 \times 10^8$ | 95 |
| 21 | Centrifuge | do | $11.3 \times 10^8$ | 122 |
| 22 | Cascade | do | $9.5 \times 10^8$ | 102 |
| 23 | Centrifugal film | do | $9.6 \times 10^8$ | 103 |

A 16-hour development of *Micrococcus pyogenes* (200 ml.) was prepared in Tryptose Broth (Difco) (1% inoculum, incubated 30° C.). Aliquots were assayed or frozen, thawed, and assayed exactly as in Examples 19–23 above. The resulting text examples are given below.

| Ex. | Freeze Method | Thaw Method | No. Viable Organisms/ml. | Percent Survival |
|---|---|---|---|---|
| 24 | None | None | $12.8 \times 10^8$ | |
| 25 | Helix | Warm Water (37° C.) | $10.2 \times 10^8$ | 80 |
| 26 | Centrifuge | do | $11.8 \times 10^8$ | 92 |
| 27 | Cascade | do | $7.6 \times 10^8$ | 59 |
| 28 | Centrifugal film | do | $13.0 \times 10^8$ | 102 |

A 96-hour development of *Aspergillus niger* (200 ml.) was prepared in Modified Fries Medium (spore-inoculum, at 30° C. with shaking). The mycelial suspension was macerated in a Waring Blendor for 5 minutes at low speed, "defoamed" with octanol and diluted with an equal volume (approx.) of isotonic saline. Aliquots were assayed or frozen, thawed and assayed as in Examples 14–28 above with the exception that the dilutions were $10^3$ and $10^1$, and plating was done on Sabaraud's Dextrose Agar (Difco) and incubation was at 37° C. for 48 hours. The results are given below.

| Ex. | Freeze Method | Thaw Method | No. Viable Organisms/ml. | Percent Survival |
|---|---|---|---|---|
| 29 | None | None | $13.0 \times 10^2$ | |
| 30 | Helix | Warm Water (37° C.) | $2.9 \times 10^2$ | 22 |
| 31 | Centrifuge | do | $3.0 \times 10^2$ | 23 |
| 32 | Cascade | do | $1.5 \times 10^2$ | 12 |
| 33 | Centrifugal film | do | $2.7 \times 10^2$ | 21 |

A 16-hour development of *Saccharomyces sp.* (yeast) (200 ml.) was prepared in Tryptose Broth (Difco) (1% inoculum, 30° C., with shaking). Aliquots were assayed or frozen, thawed, and assayed exactly as in Examples 19–28 above. The results are given below.

| Ex. | Freeze Method | Thaw Method | No. Viable Organisms/ml. | Percent Survival |
|---|---|---|---|---|
| 34 | None | None | $9.5 \times 10^9$ | |
| 35 | Helix | Warm Water (37° C.) | $4.9 \times 10^9$ | 52 |
| 36 | Centrifuge | do | $3.2 \times 10^9$ | 34 |
| 37 | Cascade | do | $3.9 \times 10^9$ | 41 |
| 38 | Centrifugal film | do | $3.8 \times 10^9$ | 40 |

C. PRESERVATION OF BEVERAGES

Orange juice, beer, and wine have been frozen in droplets using the droplet freezing technique. An advantage of freezing beverages in droplet form is that they may be more rapidly lyophilized in this form than by conventional methods.

The following examples illustrate this process.

Example 39

DROPLET FREEZING OF ORANGE JUICE IN LIQUID NITROGEN

Forty milliliters of orange juice were frozen in droplet form in each of the four freezing units previously described. Droplets were formed by spraying from a container under a few pounds air pressure.

| Freezing units: | Average droplet diameter, mm. |
|---|---|
| Helix | 1–2 |
| Cascade | 0.5–1.5 |
| Centrifugal film | 1 |
| Nitrogen centrifuge | 1 |

The frozen droplets were then stored in liquid nitrogen to await further treatment.

One or two cubic centimeters of the frozen droplets from each freezing unit were transferred from the liquid nitrogen to small flat trays in flasks kept at −77° C. The flasks were attached to the lyophilizing unit containing liquid nitrogen and immersed in methyl Cellosolve baths at −77° C. in Dewar flasks. The Cellosolve bath was then allowed to warm over the ensuing 24 hours while the orange juice droplets were being dehydrated under a pressure of about 25–35 microns. The flasks were then removed from the Cellosolve bath while still attached to the lyophilizing unit. Shortly thereafter the flasks reached room temperature and were then removed from the apparatus. The dried droplets were placed in a desiccator.

A sample of the dried droplets were reconstituted with water and tasted. The orange juice flavor appeared intact.

Example 40

DROPLET FREEZING OF BEER

Following exactly the same procedure as in Example 39, beer was frozen in droplet form in each of the four freezing units. The droplets had about the same diameter ranges as in the orange juice in Example 38 and lyophilization was carried out as in Example 38. The dried droplets were cream white in color. The droplets were reconstituted in carbonated water containing 3.4 percent ethyl alcohol. The taste was characteristic of beer.

Example 41

DROPLET FREEZING OF SHERRY WINE

Following exactly the same procedure as in Example 39, sherry wine was frozen in droplet form in each of the four freezing units. The lyophilizing procedure was carried out as in Example 38. During the drying process the droplets tended to soften and fuse gradually into a thin film. The dried product was translucent and had a pleasant taste.

What is claimed is:

1. A process for treating blood which comprises the steps of collecting the blood in an anti-coagulant medium, adding a protective additive, storing the blood-additive mixture at a temperature of about 4° C. for at least one hour, introducing droplets of said blood-additive mixture into a moving film of nitrogen whereby said droplets are quick-frozen, said droplets having a size ranging between .25 mm. and 2.0 mm. in diameter, said film of liquid nitrogen having a depth of at least about ⅛ inch and said film of liquid nitrogen moving at a rate of about at least 26 mm. per second; storing said frozen droplets in liquid nitrogen at a temperature of below about −130° C., and thereafter introducing the frozen droplets into a moving aqueous bath of polyvinylpyrrolidone and NaCl whereby said frozen droplets are thawed, said bath being maintained at a constant temperature.

2. A process for treating blood which comprises the steps of collecting the blood in an anti-coagulant medium, adding a protective additive, storing the blood-additive mixture at a temperature of between about 4° C. and under 37° C. for at least one hour, introducing droplets of said blood-additive mixture into a moving film of nitrogen, whereby said droplets are quick-frozen, said droplets having a size ranging between about 0.25 mm. and 2.0 mm. in diameter, said film of liquid nitrogen having a depth of at least about ⅛ inch and said film of liquid nitrogen moving at a rate of at least 26 mm. per second; storing said frozen droplets in liquid nitrogen at a temperature of below about 130° C., and thereafter introducing the frozen droplets into a moving aqueous bath having a concentration of between 1% and 10% polyvinylpyrrolidone in a 0.85% NaCl solution, whereby said droplets are thawed, said bath being maintained at a constant temperature of between about 37° to 47° C.

3. A process for treating blood which comprises the steps of collecting the blood in an anti-coagulant medium, adding a protective additive, storing the blood-additive mixture at a temperature of between about 4° C. and under 37° C. for at least one hour, introducing droplets of said mixture into a moving film of nitrogen whereby said droplets are quick-frozen, said droplets having a size ranging between about 0.25 mm. and 2.0 mm. in diameter, said film of liquid nitrogen having a depth of at least about ⅛ inch and said film of liquid nitrogen moving at a rate of at least 26 mm. per second; storing said frozen droplets in liquid nitrogen at a temperature of below about −130° C., and thereafter introducing the frozen droplets into a column of steam whereby the droplets are thawed, and collecting the thawed droplets in a collection vessel.

4. A process for treating biological substances which comprises the steps of introducing droplets of said biological substances into a moving film of nitrogen whereby said droplets are quick-frozen, said droplets having a size not greater than 2.0 mm. in diameter, said film of nitrogen having a depth of at least about ⅛ inch and said film of liquid nitrogen moving at a rate of at least 26 mm. per second; storing said frozen droplets in liquid nitrogen at a temperature of below about −130° C. and thereafter introducing the frozen droplets into a moving aqueous bath containing between about 1 to 10% polyvinylpyrrolidone and NaCl whereby said frozen droplets are thawed, said bath being maintained at a constant temperature of between about 37° C. and 50° C.

5. A process for treating microorganisms which comprises the steps of introducing droplets of said microorganisms into a moving film of nitrogen whereby said droplets are quick-frozen, said droplets having a size not greater than 2.0 mm. in diameter, said film of nitrogen having a depth of at least about ⅛ inch and said film of liquid nitrogen moving at a rate of at least 26 mm. per second, storing said frozen droplets in liquid nitrogen at a temperature of below about −130° C., and thereafter introducing the frozen droplets into an aqueous bath of isotonic saline solution held at a temperature of about 37° C., whereby said frozen droplets are thawed.

6. A process for quick-freezing biological substances which comprises introducing droplets of said biological substances into a moving film of a substantially inert liquid refrigerant having a temperature substantially below the critical temperature zone of the biological substances.

7. A process for quick-freezing biological substances which comprises introducing droplets of said biological substances into a moving film of liquid nitrogen, said droplets having size not greater than 2.0 mm. in diameter, said film of liquid nitrogen having a depth of at least about ⅛ inch and said film of liquid nitrogen moving at a rate of at least 26 mm. per second.

8. A process as claimed in claim 6 in which the droplets are introduced into a film of nitrogen flowing in a substantially downward, cascading direction.

9. A process as claimed in claim 6 in which the droplets are directed on to a film of nitrogen moving as the result of centrifugal impetus.

10. A process as claimed is claim 6 in which the droplets are introduced into a film of nitrogen flowing in a downward spiraling direction.

11. A process for thawing frozen droplets of biological substances which comprises introducing said frozen droplets into a constant-temperature moving aqueous bath of polyvinylpyrrolidone and NaCl.

12. A process for thawing frozen droplets of biological substances which comprises introducing said frozen droplets into a moving aqueous bath containing between 1% and 10% polyvinylpyrrolidone and NaCl, said moving aqueous bath being maintained at a constant temperature of between about 37° C. and 50° C.

13. A process for thawing frozen droplets of biological substances which comprises introducing said frozen droplets into a column of steam, and collecting the droplets thawed thereby in a collection vessel.

14. A process as claimed in claim 11, in which the biological substance is blood.

15. A process as claimed in claim 13, in which the biological substance is blood.

16. A process for treating blood which comprises the steps of centrifuging blood whereby the red blood cells are separated from the blood plasma, resuspending the red blood cells in a solution of polyvinylpyrrolidone, introducing these droplets of cells into a moving film of liquid nitrogen, whereby said droplets are quick-frozen, storing said frozen droplets in liquid nitrogen at a temperature of below about —130° C., and introducing the frozen droplets into a moving aqueous solution of 7% polyvinylpyrrolidone and isotonic NaCl, said solution being maintained at a temperature of about 47° C.

17. A process for treating orange juice which comprises introducing droplets of said orange juice into a moving film of liquid nitrogen whereby said droplets are quick-frozen, storing said frozen droplets in liquid nitrogen and thereafter lyophilizing the frozen droplets.

18. A process for treating beer which comprises introducing droplets of said beer into a moving film of liquid nitrogen whereby said droplets are quick-frozen, storing said frozen droplets in liquid nitrogen and thereafter lyophilizing the frozen droplets.

19. A process for treating sherry wine, which comprises introducing droplets of said sherry wine into a moving film of liquid nitrogen whereby said droplets are quick-frozen, storing said frozen droplets in liquid nitrogen and thereafter lyophilizing the frozen droplets.

20. A process for quick-freezing biological substances which comprises sterilizing liquid nitrogen refrigerant by filtration through an ultra-fine filter which excludes substances having a critical diameter greater than 0.5 micron, and introducing droplets of biological substance into a moving film of such sterilized liquid nitrogen.

21. A process according to claim 6 wherein said biological substance is blood.

22. A process according to claim 6 wherein such biological substance is beer.

23. A process according to claim 6 wherein such biological substance is orange juice.

24. A process according to claim 6 wherein such biological substance is sherry wine.

25. A process according to claim 7 wherein such biological substance is blood.

26. A process according to claim 7 wherein such biological substance is beer.

27. A process according to claim 7 wherein such biological substance is orange juice.

28. A process according to claim 7 wherein such biological substance is sherry wine.

29. A process for treating microorganisms which comprises the steps of introducing droplets of *Azotobacter vinelandii* into a moving film of nitrogen whereby said droplets are quick frozen, storing said frozen droplets in liquid nitrogen at a temperature of below —130° C., and thereafter introducing the frozen droplets into an aqueous bath of isotonic saline solution held at a temperature of about 37° C. whereby said frozen droplets are thawed.

30. A process for treating microorganisms which comprises the steps of introducing droplets of *Micrococcus pyogenes* into a moving film of nitrogen whereby said droplets are quick frozen, storing said frozen droplets in liquid nitrogen at a temperature of below —130° C., and thereafter introducing the frozen droplets into an aqueous bath of isotonic saline solution held at a temperature of about 37° C. whereby said frozen droplets are thawed.

31. A process for treating microorganisms which comprises the steps of introducing droplets of *Aspergillus niger* into a moving film of nitrogen whereby said droplets are quick frozen, storing said frozen droplets in liquid nitrogen at a temperature of below —130° C., and thereafter introducing the frozen droplets into an aqueous bath of isotonic saline solution held at a temperature of about 37° C. whereby said frozen droplets are thawed.

32. A process for treating microorganisms which comprises the steps of introducing droplets of *Escherichia coli* into a moving film of nitrogen whereby said droplets are quick frozen, storing said frozen droplets in liquid nitrogen at a temperature of below —130° C., and thereafter introducing the frozen droplets into an aqueous bath of isotonic saline solution held at a temperature of about 37° C. whereby said frozen droplets are thawed.

33. A process for treating microorganisms which comprises the steps of introducing droplets of *Saccharomyces sp.* into a moving film of nitrogen whereby said droplets are quick frozen, storing said frozen droplets in liquid nitrogen at a temperature of below —130° C., and thereafter introducing the frozen droplets into an aqueous bath of isotonic saline solution held at a temperature of about 37° C. whereby said frozen droplets are thawed.

References Cited by the Examiner

UNITED STATES PATENTS

| | | | |
|---|---|---|---|
| 1,944,857 | 1/1934 | Atwell | 99—198 |
| 2,085,391 | 6/1937 | Reichel | 167—78 |
| 2,396,561 | 3/1946 | Flosdorf | 99—206 |
| 2,461,837 | 2/1949 | Nesset | 167—78 |
| 2,471,035 | 5/1949 | Hurd | 34—92 |
| 2,822,126 | 2/1958 | Cohn | 167—78 |

OTHER REFERENCES

Bertcher, PSEBM, 80:3, July 1952, pp. 508–509.

Brown, AMA Arch. of Surg., volume 66, January–June 1953, pp. 267–275, 282.

Burlage, Fundamental Principles and Processes of Pharmacy, 1949, pages 528 and 530, McGraw-Hill Book Company, New York, New York.

Commonwealth Engineering Company v. Ladd, 131 U.S.P.Q., 255–258.

Freezing and Drying, 1951, Church Army Press, Oxford, England, pages 80, 82 and 84.

Hartman, JAMA, 152:112, July 18, 1953, pp. 1116–1120.

Science News Letter, 69:5, Feb. 4, 1956, page 73.

Tullis, Blood, J. of Hema., 8:6, June 1953, pages 563–75.

JULIAN S. LEVITT, *Primary Examiner.*

WILLIAM B. KNIGHT, MORRIS O. WOLK, FRANK CACCIAPAGLIA, JR., LEWIS GOTTS, *Examiners.*